United States Patent
Suh et al.

(10) Patent No.: US 7,599,274 B2
(45) Date of Patent: *Oct. 6, 2009

(54) RECORDING MEDIUM WITH INTERMITTENT OR ALTERNATE WOBBLED PITS AND APPARATUS AND METHODS FOR FORMING, RECORDING, AND REPRODUCING THE RECORDING MEDIUM

(75) Inventors: Sang Woon Suh, Seoul (KR); Jin Yong Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/898,040

(22) Filed: Sep. 7, 2007

(65) Prior Publication Data
US 2008/0043607 A1    Feb. 21, 2008

Related U.S. Application Data

(63) Continuation of application No. 10/762,538, filed on Jan. 23, 2004.

(30) Foreign Application Priority Data

| Jan. 23, 2003 | (KR) | 2003-004487 |
| Jan. 27, 2003 | (KR) | 2003-005211 |
| Mar. 14, 2003 | (KR) | 2003-016139 |

(51) Int. Cl.
*G11B 7/00* (2006.01)

(52) U.S. Cl. ........... 369/59.25; 369/52.1; 369/44.13; 369/275.4

(58) Field of Classification Search ............ None
See application file for complete search history.

(56) References Cited

U.S. PATENT DOCUMENTS

| 4,879,707 | A | * | 11/1989 | Getreuer et al. | ......... | 369/44.28 |
| 5,295,127 | A | * | 3/1994 | Verboom et al. | ......... | 369/53.24 |
| 5,572,507 | A | * | 11/1996 | Ozaki et al. | ............. | 369/53.21 |
| 5,689,486 | A | | 11/1997 | Shimizu et al. | | |
| 5,706,268 | A | | 1/1998 | Horimai | | |
| 5,737,286 | A | | 4/1998 | Timmermans et al. | | |
| 5,799,501 | A | | 9/1998 | Leonard et al. | | |
| 5,809,006 | A | | 9/1998 | Davis et al. | | |
| 5,818,805 | A | | 10/1998 | Kobayashi et al. | | |
| 5,848,050 | A | * | 12/1998 | Nagasawa et al. | ......... | 369/275.4 |
| 5,878,007 | A | * | 3/1999 | Matsumoto et al. | ...... | 369/44.34 |

(Continued)

FOREIGN PATENT DOCUMENTS

CN    1152170    6/1997

(Continued)

OTHER PUBLICATIONS

Machine-translated JP09081938A.*

(Continued)

*Primary Examiner*—Wayne R Young
*Assistant Examiner*—Adam R Giesy
(74) *Attorney, Agent, or Firm*—Harness, Dickey & Pierce

(57) ABSTRACT

A recording medium, such as a high-density and/or read-only recording medium, such as BD-ROM, which contains a control ionformation, such as copy protection information, encoded in intermittent or alternate wobbled pits, and to methods and apparatuses for forming, recording, and reproducing data on the recording medium.

19 Claims, 12 Drawing Sheets

U.S. PATENT DOCUMENTS

| | | | |
|---|---|---|---|
| 5,892,797 A * | 4/1999 | Deng | 375/361 |
| 5,894,463 A * | 4/1999 | Okawa et al. | 369/44.35 |
| 6,021,199 A | 2/2000 | Ishibashi | |
| 6,031,815 A | 2/2000 | Heemskerk | |
| 6,223,247 B1 * | 4/2001 | Otsuka et al. | 711/4 |
| 6,223,285 B1 | 4/2001 | Komuro et al. | |
| 6,289,102 B1 | 9/2001 | Ueda et al. | |
| 6,353,890 B1 | 3/2002 | Newman | |
| 6,519,213 B1 | 2/2003 | Song et al. | |
| 6,538,982 B1 | 3/2003 | Van Vlerken et al. | |
| 6,549,495 B1 | 4/2003 | Spruit et al. | |
| 6,550,009 B1 | 4/2003 | Uranaka et al. | |
| 6,664,526 B2 | 12/2003 | Yokoi | |
| 6,708,299 B1 | 3/2004 | Xie | |
| 6,885,629 B2 | 4/2005 | Oshima et al. | |
| 6,930,977 B1 | 8/2005 | Kondo et al. | |
| 6,938,162 B1 | 8/2005 | Nagai et al. | |
| 7,248,558 B2 | 7/2007 | Kobayashi et al. | |
| 7,266,074 B2 * | 9/2007 | Kim et al. | 369/124.12 |
| 2001/0036132 A1 | 11/2001 | Kobayashi et al. | |
| 2002/0041686 A1 | 4/2002 | Moriyama et al. | |
| 2002/0048241 A1 | 4/2002 | Kumagai et al. | |
| 2002/0089920 A1 | 7/2002 | Gotoh et al. | |
| 2002/0181358 A1 * | 12/2002 | Sako | 369/47.24 |
| 2003/0007432 A1 | 1/2003 | Minamino et al. | |
| 2003/0012375 A1 | 1/2003 | Sako et al. | |
| 2003/0053404 A1 | 3/2003 | Kondo | |
| 2003/0117920 A1 * | 6/2003 | Sako et al. | 369/53.21 |
| 2004/0076110 A1 * | 4/2004 | Hino et al. | 369/275.3 |
| 2004/0120247 A1 | 6/2004 | Lee et al. | |
| 2004/0151091 A1 | 8/2004 | Ma et al. | |
| 2005/0018555 A1 * | 1/2005 | Sabi et al. | 369/44.26 |
| 2005/0099916 A1 | 5/2005 | Jeon et al. | |
| 2005/0122889 A1 * | 6/2005 | Kobayashi et al. | 369/275.4 |

FOREIGN PATENT DOCUMENTS

| | | |
|---|---|---|
| CN | 1293810 A | 5/2001 |
| CN | 1362707 | 8/2002 |
| EP | 0 299 573 B1 | 1/1989 |
| EP | 0 545 472 A1 | 6/1993 |
| EP | 0 723 216 A2 | 7/1996 |
| EP | 0 807 929 A1 | 11/1997 |
| EP | 0 898 271 | 2/1999 |
| EP | 0 936 610 A2 | 8/1999 |
| EP | 1 028 423 B1 | 8/2000 |
| EP | 1 058 254 A2 | 12/2000 |
| EP | 1 067 540 A2 | 1/2001 |
| EP | 1 122 729 A1 | 8/2001 |
| EP | 1 152 412 A1 | 11/2001 |
| EP | 1 168 312 A1 | 1/2002 |
| EP | 1 229 537 A2 | 8/2002 |
| EP | 1 168 328 B1 | 1/2005 |
| EP | 0 997 899 B1 | 5/2005 |
| JP | 05-036194 | 2/1993 |
| JP | 05-325193 | 12/1993 |
| JP | 07-272282 | 10/1995 |
| JP | 08-147704 | 6/1996 |
| JP | 09-081938 | 3/1997 |
| JP | 09081938 A * | 3/1997 |
| JP | 09-128874 | 5/1997 |
| JP | 10-003746 | 1/1998 |
| JP | 8124171 | 5/1998 |
| JP | 10-269577 | 10/1998 |
| JP | 11-066739 | 3/1999 |
| JP | 11-086436 | 3/1999 |
| JP | 11-261950 | 9/1999 |
| JP | 11-317002 | 11/1999 |
| JP | 2000-149415 | 5/2000 |
| JP | 2000-195049 | 7/2000 |
| JP | 2000-195094 | 7/2000 |
| JP | 2000-231722 | 8/2000 |
| JP | 2000-298941 | 10/2000 |
| JP | 2001-135021 | 5/2001 |
| JP | 2001-167517 | 6/2001 |
| JP | 2001-189051 | 7/2001 |
| JP | 2001-243355 | 9/2001 |
| JP | 2001-256678 | 9/2001 |
| JP | 2001-332031 | 11/2001 |
| JP | 2001-344765 | 12/2001 |
| JP | 2002-042347 | 2/2002 |
| JP | 2002-163857 | 6/2002 |
| JP | 2002-197674 | 7/2002 |
| JP | 2002-197789 | 7/2002 |
| JP | 2002-203374 | 7/2002 |
| JP | 2002-216360 | 8/2002 |
| JP | 2002-304809 | 10/2002 |
| JP | 2002-311976 | 10/2002 |
| JP | 2002-319245 | 10/2002 |
| JP | 2002-367281 | 12/2002 |
| JP | 2003-006997 | 1/2003 |
| KR | 2001-0051834 | 6/2001 |
| KR | 10-2004-0048476 | 6/2004 |
| WO | WO 97/45836 | 12/1997 |
| WO | WO 00/21085 | 4/2000 |
| WO | WO 02/37493 A1 | 10/2001 |
| WO | WO 02/15183 A2 | 2/2002 |
| WO | WO 02/31821 A1 | 4/2002 |
| WO | WO 2004/066286 A1 | 8/2004 |
| WO | WO 2004/095439 | 11/2004 |

OTHER PUBLICATIONS

Translation of Taiwanese Official Action issued Apr. 12, 2006.
Notification Concerning Transmittal of IPER dated Aug. 11, 2005.
Int'l Preliminary Report on Patentability dated Jul. 29, 2005.
European Search Report in EP 06 00 1615 dated Sep. 14, 2006.
Supplemental European Search Report in EP 04 70 3531 dated Sep. 14, 2006.
Notification of The First Office Action in Chinese App. No. 200480000395.X issued Sep. 1, 2006.
Chinese Office Action corresponding to Chinese Application No. 200480000399.8 dated Dec. 19, 2008.
European Office Action dated Jun. 12, 2006 for European Application No. 04703541.5.
Chinese Office Action dated Sep. 1, 2006 for Chinese Application No. 200480000399.8.
European Office Action dated Sep. 22, 2006 for European Application No. 04703531.6.
European Office Action dated Sep. 22, 2006 for European Application No. 06001615.1.
European Office Action dated Nov. 24, 2006 for European Application No. 04705015.8.
U.S. Office Action dated Apr. 11, 2007 for U.S. Appl. No. 10/762,535.
U.S. Office Action dated Apr. 17, 2007 for U.S. Appl. No. 10/762,538.
U.S. Office Action dated Jun. 12, 2007 for U.S. Appl. No. 10/762,536.
Taiwanese Office Action dated Jul. 10, 2007 for Taiwanese Application No. 95113498.
U.S. Office Action dated Oct. 9, 2007 for U.S. Appl. No. 10/762,516.
European Patent Office Action dated Oct. 29, 2007 for European Application No. 06001616.9.
European Patent Office Action dated Nov. 7, 2007 for European Application No. 07018289.4.
U.S. office Action dated Nov. 15, 2007 for U.S. Appl. No. 10/762,535.

U.S. Office Action dated Nov. 19, 2007 for U.S. Appl. No. 10/762,536.
European Patent Office Action dated Mar. 12, 2008 for European Application No. 04703529.0.
European Patent Office Action dated Mar. 26, 2008 for European Application No. 07018405.6.
European Patent Office Action dated Apr. 2, 2008 for European Application No. 04703277.6.
U.S. Office Action dated Jun. 6, 2008 for U.S. Appl. No. 10/762,535.
Chinese Office Action Corresponding to Chinese Application No. 200610059757.3 dated Jul. 4, 2008.
Office Action for Japanese Application No. 2006-500637 dated Jun. 16, 2009.
Office Action for corresponding Japanese Application No. 2008-319384 dated Jul. 14, 2009.
Office Action for corresponding Korean Application No. 10-2003-0005211 dated Jul. 18, 2009.
Office Action for corresponding Japanese Application No. 2006-500631 dated Jul. 21, 2009.

* cited by examiner

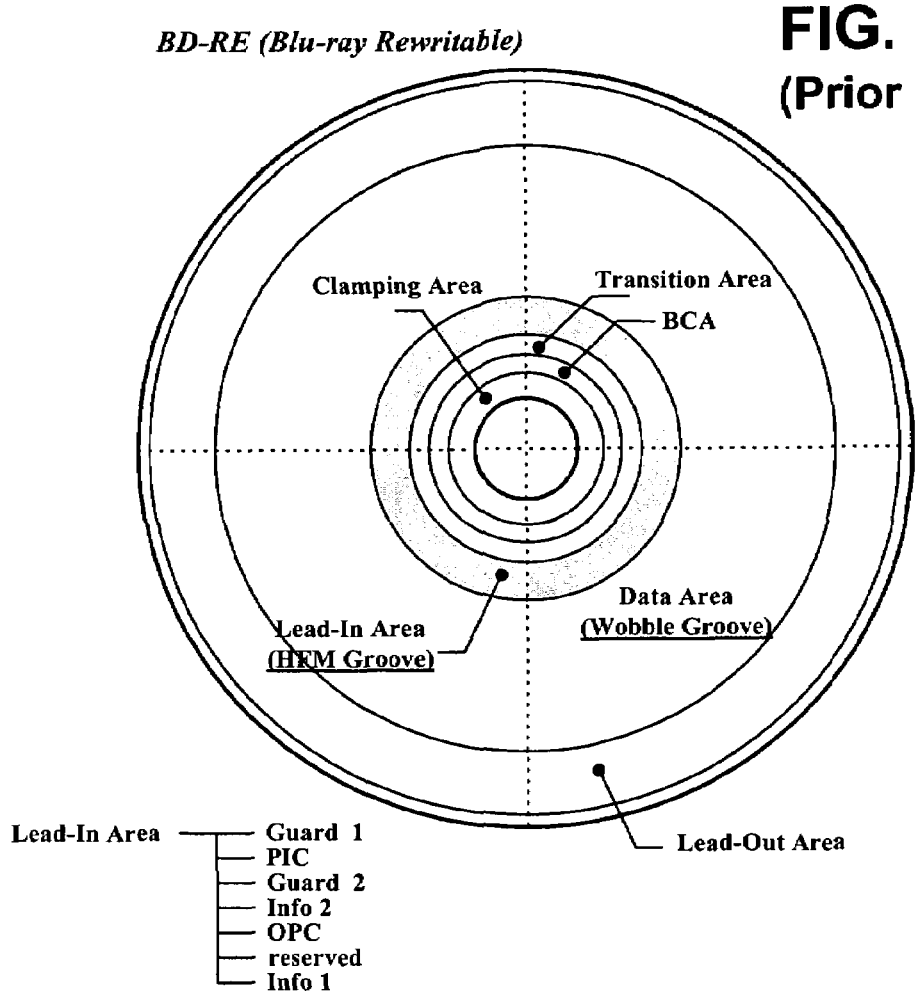

*Biphase modulated HFM groove*

FIG. 6

*Physcial Cluster (64KB)*

| FS0 | Data Frame 0 | | |
|---|---|---|---|
| : | : | | Address Unit 0 |
| FS# | Data Frame 30 | | |
| FS0 | Data Frame 0 | | |
| : | : | | Address Unit 1 |
| FS# | Data Frame 30 | | |
| : | : | | : |
| FS0 | Data Frame 0 | | |
| : | : | | Address Unit 15 |
| FS# | Data Frame 30 | | |

*Wobbled pits where ROM Mark is encoded*

FIG. 9

| Byte number | Contents | number of bytes |
|---|---|---|
| 0 | Disc Information identifier = "DI" | 2 |
| 2 | DI format | 1 |
| 3 | Reserved = 00h | 1 |
| 4 | Number of DI frames in each DI Block | 1 |
| 5 | DI Frame sequence number in DI Block | 1 |
| 6 | Number of DI bytes in use in this DI Frame | 1 |
| 7 | Reserved = 00h | 1 |
| 8 to 10 | disc type identifier = "BDO" | 3 |
| 11 | disc size / version | 1 |
| 12 | disc structure | 1 |
| 13 | channel bit length | 1 |
| 14 to 15 | Reserved = all 00h | 2 |
| 16 | BCA descriptor | 1 |
| 17 | maxium transfer rate of application | 1 |
| 18 to 23 | Reserved = all 00h | 6 |
| 24 to 31 | Data zone allocation | 8 |
| 32 to 111 | Reserved = all 00h | 13 |

FIG. 10

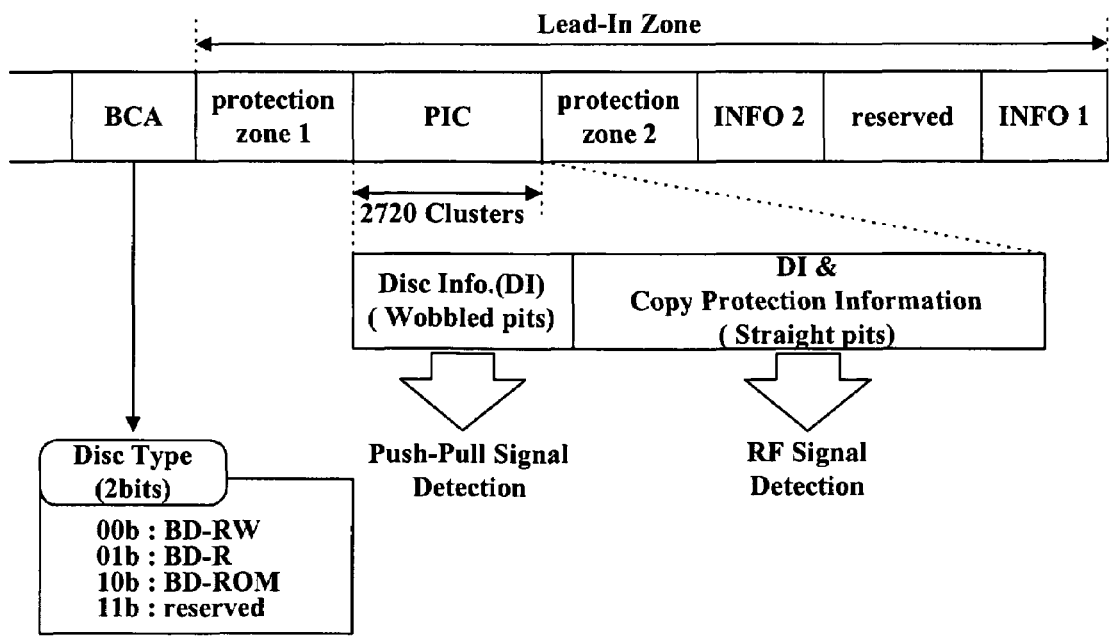

RECORDING MEDIUM WITH INTERMITTENT OR ALTERNATE WOBBLED PITS AND APPARATUS AND METHODS FOR FORMING, RECORDING, AND REPRODUCING THE RECORDING MEDIUM

DOMESTIC PRIORITY INFORMATION

This U.S. non-provisional application is a continuation of U.S. patent application Ser. No. 10/762,538, filed on Jan. 23, 2004, the entire contents are hereby incorporated by reference.

FOREIGN PRIORITY INFORMATION

This U.S. non-provisional application claims priority of Korean Patent Application No. 2003-004487, filed on Jan. 23, 2003; Korean Patent Application No. 2003-005211, filed on Jan. 27, 2003; and Korean Patent Application No. 2003-016139, filed on Mar. 14, 2003; all of which were filed in the Korean Intellectual Property Office, all of which are hereby incorporated by reference.

BACKGROUND OF THE INVENTION

1. Field of the Invention

The present invention relates to a recording medium such as BD-ROM (Blu-ray Disc ROM) which has data written in intermittent or alternate wobbled (or zigzag) pits and an apparatus and methods for forming, recording, and reproducing the recording medium.

2. Description of the Related Art

Recently, the standardization of Blu-ray Disc Rewritable (BD-RE), which is a new high-density rewritable optical disk capable of recording large capacity, high-quality video and audio data, is in progress. BD-RE related products are expected to be available on the market in the near future.

FIG. 1A depicts the structure of a BD-RE, wherein a clamping area, a burst cutting area (BCA), a transition area, a lead-in area, a data area, and lead-out area are disposed in order as shown.

As illustrated in FIG. 1B, the BCA is located in the innermost circumferential area of the BD-RE that is accessed first when the disk is loaded into a reproducing apparatus and may contain an information for the disc, such as serial number and other optional information pre-recorded by disc manufacturer.

The lead-in area may comprise several pre-assigned areas such as a first guard (Guard 1) area, a permanent information & control data (PIC) area, a second guard (Guard 2) area, a second information (Info 2) area, and an optimum power calibration (OPC) area. The Guard 1 area and the PIC area are pre-recorded areas in which some initial data is pre-recorded, whereas the other areas of the lead-in area, the data area, and the lead-out areas are all rewritable areas.

In the PIC area, important permanent disc information is encoded in a wobbled groove by high frequency modulation (HFM).

HFM Grooves may be modulated in the radial direction with a rather high bandwidth signal, to create a data channel for replicated information with sufficient capacity and data rate.

As depicted in FIG. 2, the wobble-shaped data encoding is performed by bi-phase modulation. In this modulation method, a bit with value 0 may be represented by a transition at the start of the bit cell and a bit with value 1 may be represented by a transition at the start and in the middle of the bit cell. The modulated bits may be recorded on the disc by a deviation of the groove from an average centerline as indicated in FIG. 2. The length of each bit cell may be 36T, where T corresponds to the length of a channel bit in the rewritable data areas.

Also, a read-only Blu-ray Disk (BD-ROM) is also under development along with the BD-RE. A BD-ROM may include an inner area, a clamping area, a transition area, an information area, and a rim area, as shown in FIG. 3.

The information area may further comprise a BCA, a lead-in zone, a data zone, a lead-out zone, and an outer zone. As in BD-RE, the BCA may contain disc important information (DII), such as a disc serial number and copy protection information (CPI). If a BD-ROM is copy protected, the DII may be required to decrypt the main data contained on the BD-ROM.

The disc information in the PIC zone may be recorded as straight pits in the same way as main data such as audio/video (A/V) streams are recorded in the data zone. The disc information may be 17PP-modulated data written in the form of an error correction code (ECC) block of size 64 KB, for example.

In this case, however, it takes some demodulation time to retrieve the disc information from the BD-ROM because the disc information may be demodulated by an RF signal detection method.

As described above, the disc information contained in the PIC area of a BD-RE may be encoded in a wobbled groove by HFM. If the disc information is recorded in the PIC zone of a BD-ROM as straight pits, an optical disk reproducing apparatus should be able to apply different detecting schemes to obtain the disc information depending on the disk type (BD-RE or BD-ROM). Unless the correct scheme is chosen, the optical disk reproducing apparatus will fail to detect the disc information. For example, if a method for detecting HFM-modulated disc information encoded in a wobbled groove of a BD-RE is applied to a BD-ROM, the optical disk reproducing apparatus will not be able to retrieve the disc information which is recorded in the PIC zone as straight pits.

In addition, if the disc important information (DII) contained in the BCA cannot be retrieved due to a read error, it is impossible to retrieve the data recorded on the disk. For example, if an error occurs while the copy protection information (CPI) is retrieved from the BCA, it may be impossible to reproduce the main data recorded in the data zone because the data cannot be decrypted.

Also, because the copy protection information (CPI) recorded on PIC area of the disk includes important data, e.g., key data to decrypt encrypted main data recorded on the data zone, it should not be detected easily by any illegal device and copied to other recording media to protect the encrypted contents recorded on the disk. It should be only detected by a desired detection method in a legally permitted device to ensure robustness.

SUMMARY OF THE INVENTION

In exemplary embodiments, the present invention is directed to a recording medium, such as a high-density and/or read-only recording medium, such as BD-ROM, capable of rapidly detecting disc information required for reproducing the contents recorded thereon, and to methods and apparatuses for forming, recording, and reproducing data on the recording medium.

In exemplary embodiments, the present invention is directed to a recording medium, such as a high-density and/or read-only recording medium, such as BD-ROM, capable of reproducing main data even if there is a failure in reading disc important information from one or more location on the recording medium, and to methods and apparatuses for forming, recording, and reproducing data on the recording medium.

In exemplary embodiments, the present invention is directed to a recording medium, such as a high-density and/or read-only recording medium, such as BD-ROM, including control (or ecryption] information for reproducing (decrypting] contents recorded on the recording medium in such a way that the decryption information is not copied to other recording media and/or other types of recording media, and to methods and apparatuses for forming, recording, and reproducing data on the recording medium.

In exemplary embodiments, the present invention is directed to a recording medium, such as a high-density and/or read-only recording medium, such as BD-ROM, which contains disc information encoded in wobbled pits in some sections of the recording medium, such as the PIC zone, and to methods and apparatuses for forming, recording, and reproducing data on the recording medium.

In exemplary embodiments, the present invention is directed to a recording medium, such as a high-density and/or read-only recording medium, such as BD-ROM, which contains disc important information in more than one location, for example, in the BCA and in another area other than the BCA, and to methods and apparatuses for forming, recording, and reproducing data on the recording medium.

In exemplary embodiments, the present invention is directed to a recording medium, such as a high-density and/or read-only recording medium, such as BD-ROM, which contains copy protection information encoded in wobbled pits, and to methods and apparatuses for forming, recording, and reproducing data on the recording medium.

In exemplary embodiments, the present invention is directed to a recording medium, such as a high-density and/or read-only recording medium, such as BD-ROM, which contains copy protection information encoded in intermittently formed arrays of wobbled pits in a distributed manner, and to methods and apparatuses for forming, recording, and reproducing data on the recording medium.

In exemplary embodiments, the present invention is directed to a recording medium, such as a high-density and/or read-only recording medium, such as BD-ROM, which contains a control data area including pits formed along tracks, with data recorded therein, wherein pits formed in some portions of the tracks are shifted from a track center to left and/or right to thereby form intermittent or alternate wobbled pits and wherein pits formed in other portions of the tracks of the control data area are substantially along the track center to thereby form straight pits and to methods and apparatuses for forming, recording, and reproducing data on the recording medium.

In exemplary embodiments, the present invention is directed to a recording medium, such as a high-density and/or read-only recording medium, such as BD-ROM, which contains a control data area including pits formed along tracks, with data recorded therein, wherein pits formed in some portions of the tracks are shifted from a track center to left and/or right to thereby form intermittent or alternate wobbled pits and wherein pits formed in other portions of the tracks of the control data area are substantially along the track center to thereby form straight pits.

In exemplary embodiments, the present invention is directed to a method of forming a recording medium, such as a high-density and/or read-only recording medium, such as BD-ROM, which includes forming pits in a control data area along tracks, with data recorded therein, wherein pits formed in some portions of the tracks are shifted from a track center to left and/or right to thereby form intermittent or alternate wobbled pits and wherein pits formed in other portions of the tracks of the control data area are substantially along the track center to thereby form straight pits.

In exemplary embodiments, the present invention is directed to a method of reproducing data from a recording medium, such as a high-density and/or read-only recording medium, such as BD-ROM, which includes detecting information recorded in pits formed along tracks in a control data area, wherein pits formed in some portions of the tracks are shifted from a track center to left and/or right to thereby form intermittent or alternate wobbled pits and wherein pits formed in other portions of the tracks of the control data area are substantially along the track center to thereby form straight pits.

In exemplary embodiments, the present invention is directed to a method of recording data to a recording medium, such as a high-density and/or read-only recording medium, such as BD-ROM, which includes recording data in pits formed along tracks in a control data area, wherein pits formed in some portions of the tracks are shifted from a track center to left and/or right to thereby form intermittent or alternate wobbled pits and wherein pits formed in other portions of the tracks of the control data area are substantially along the track center to thereby form straight pits.

In exemplary embodiments, the present invention is directed to an apparatus for reproducing data from a recording medium, such as a high-density and/or read-only recording medium, such as BD-ROM, which includes utilizing pits formed along tracks in a control data area, with data recorded therein, wherein pits formed in some portions of the tracks are shifted from a track center to left and/or right to thereby form intermittent or alternate wobbled pits and wherein pits formed in other portions of the tracks of the control data area are substantially along the track center to thereby form straight pits.

BRIEF DESCRIPTION OF THE DRAWINGS

The accompanying drawings, which are included to provide a further understanding of the invention, illustrate exemplary embodiments of the invention, and together with the description, serve to explain the principles of the present invention.

In the drawings:

FIGS. 1A and 1B illustrate the structure of a conventional BD-RE;

FIG. 6 illustrates the data structure of a physical cluster of a BD-ROM in an exemplary embodiment of the present invention;

FIG. 9 illustrates disc information fields recorded on a BD-ROM in an exemplary embodiment of the present invention;

FIG. 10 illustrates disc type information recorded in the BCA in accordance with an exemplary embodiment of the invention.

DETAILED DESCRIPTION OF EXEMPLARY EMBODIMENTS

In order that the invention may be fully understood, exemplary embodiments thereof will now be described with reference to the accompanying drawings.

Figure 3:
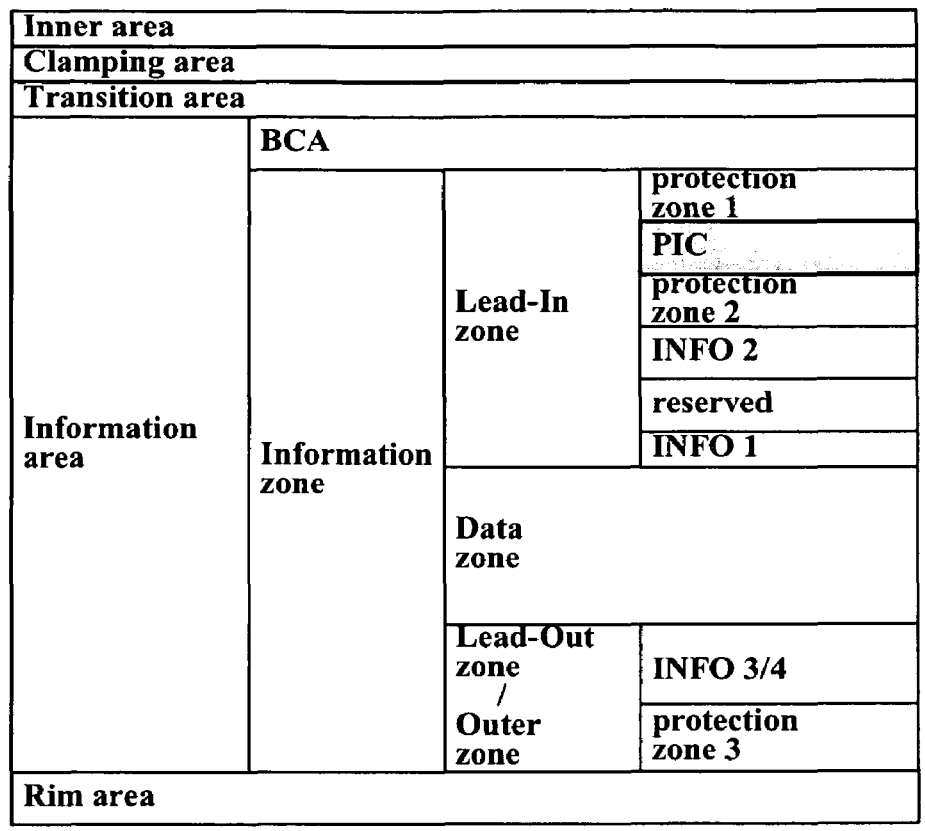
FIG. 3 illustrates areas assigned to a BD-ROM.
Figure 4A:
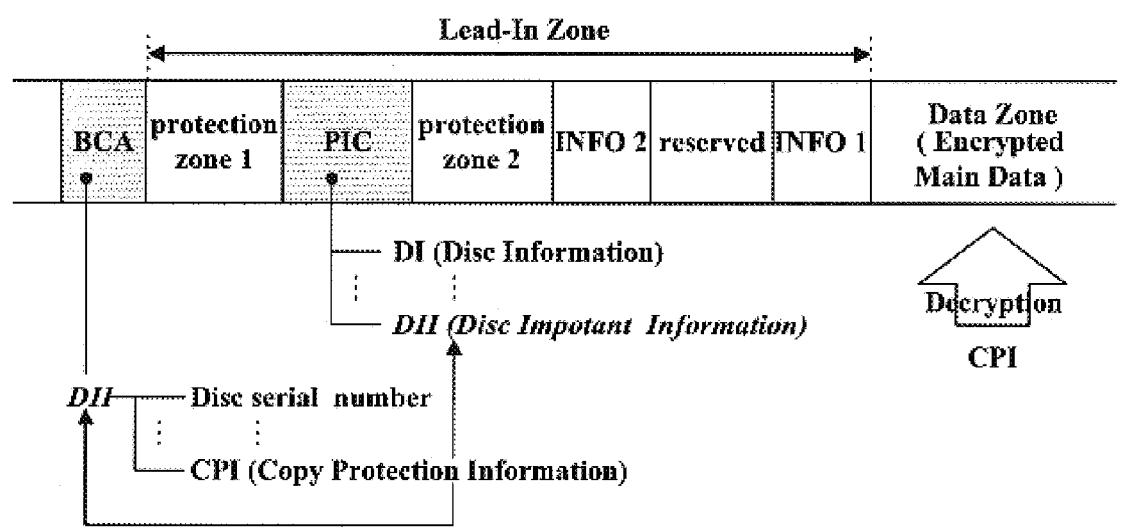
FIGS. 4A-4F illustrate several formats of data recorded in the PIC zone of a BD-ROM in accordance with exemplary embodiments of the invention.

The BD-ROM in accordance with exemplary embodiments of the invention may include an inner area, a clamping area, a transition area, an information area, and a rim area, as described above with reference to FIG. 3. As illustrated in FIG. 4A, the DII, such as a disc serial number and copy protection information recorded in the BCA, is copied to the PIC zone contained in the information area at least once. The copy protection information can be a key value required to decrypt the encrypted main data of A/V streams recorded in the data zone.

Figure 4B:
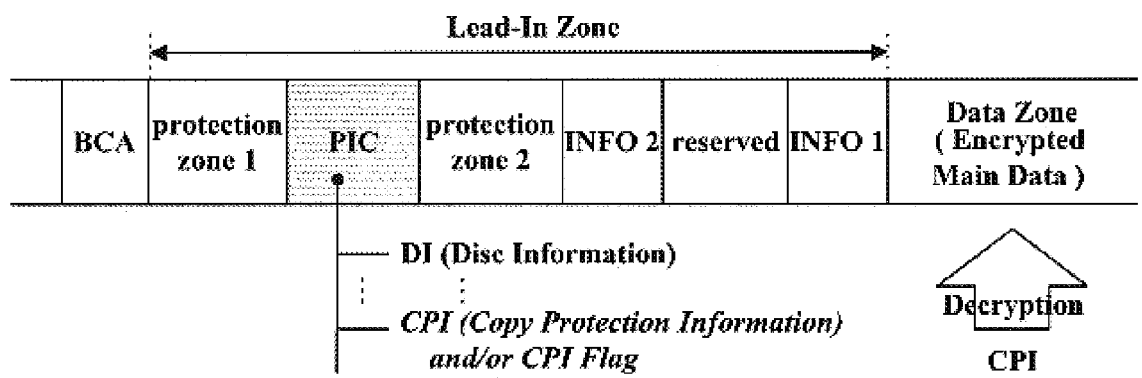

The copy protection information may not be recorded in the BCA and be only recorded in the PIC zone, which is illustrated in FIG. 4B. The copy protection information may also be called a 'ROM mark' and may contain an additional flag (CPI flag) indicating whether the copy protection information is recorded.

Figure 4C:
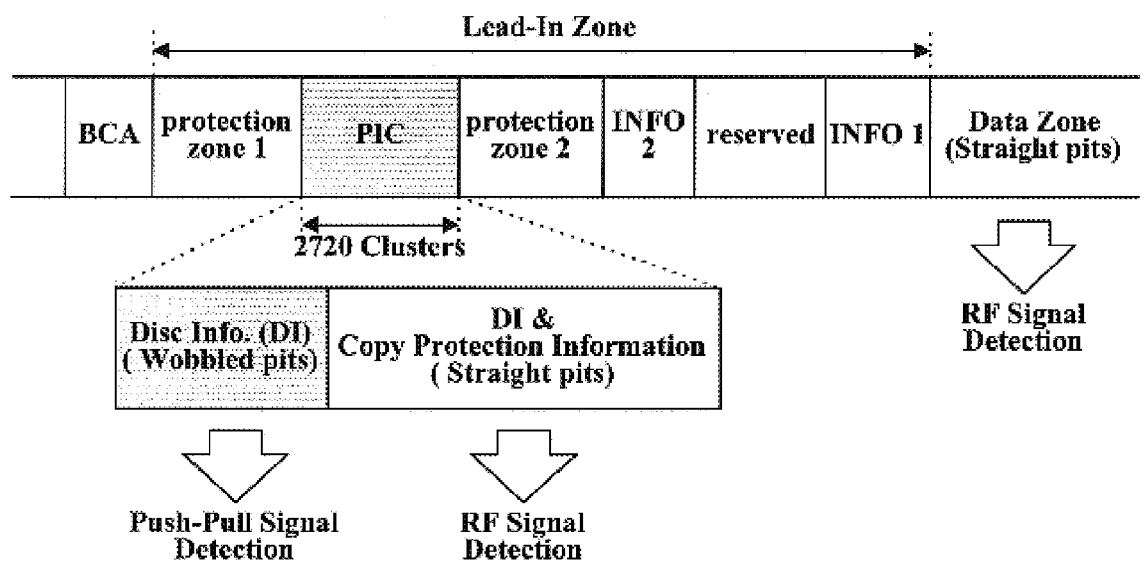

As depicted in FIG. 4C, the information contained in the PIC may be recorded partly as wobbled pits (or zigzag pits) and partly as straight pits. The main data may be recorded in the data zone as straight pits.

In an exemplary embodiment, the PIC zone may contain 2,720 clusters of data. The first cluster may contain disc information recorded as wobbled pits by bi-phase modulation. The other clusters may contain 17PP modulated disc information and copy protection information having ECC blocks of size 64 KB and recorded as straight pits, for example the disc information recorded as wobbled pits may be detected by a push-pull signal detecting method and the disc information and copy protection information recorded as straight pits may be detected by an RF signal detecting method. The push-pull signal typically has lower frequency components than the RF signal.

In an exemplary embodiment, the DII additionally copied to the PIC zone can be encoded in wobbled pits to prevent it from being detected by the RF signal detecting method.

Figure 4D:
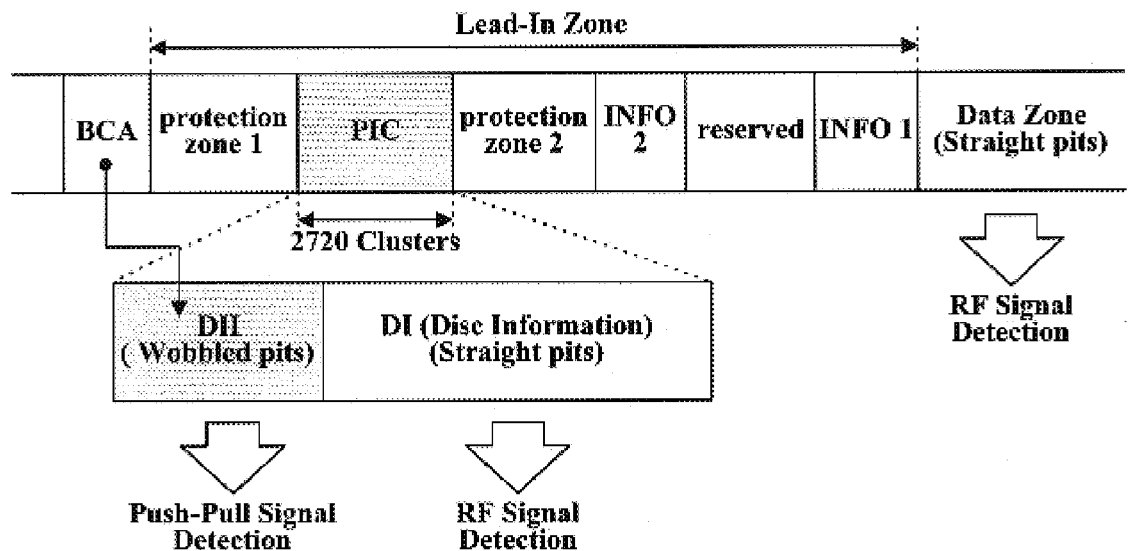
Figure 4E:
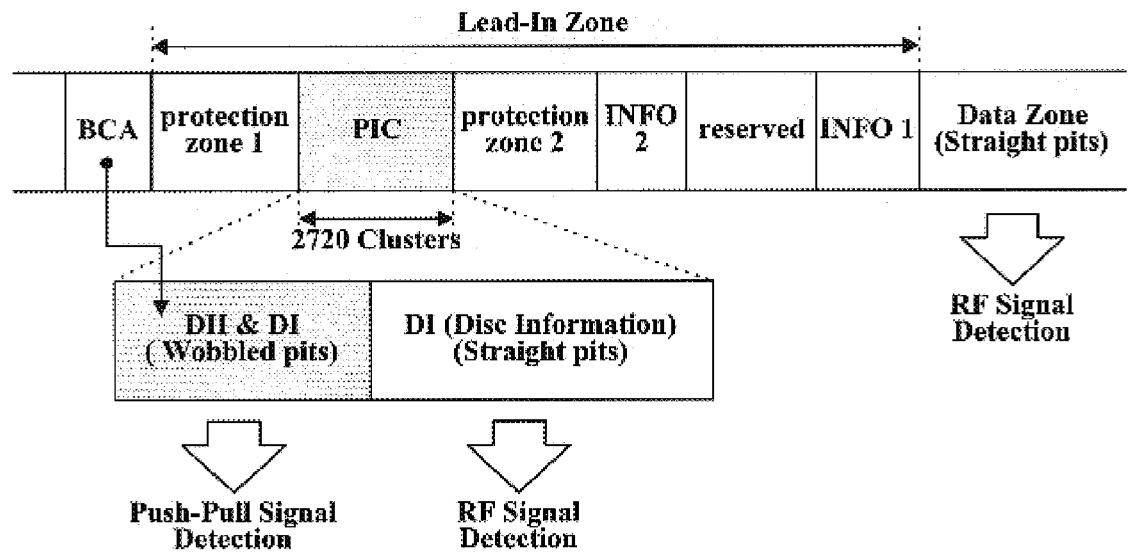
Figure 4F:
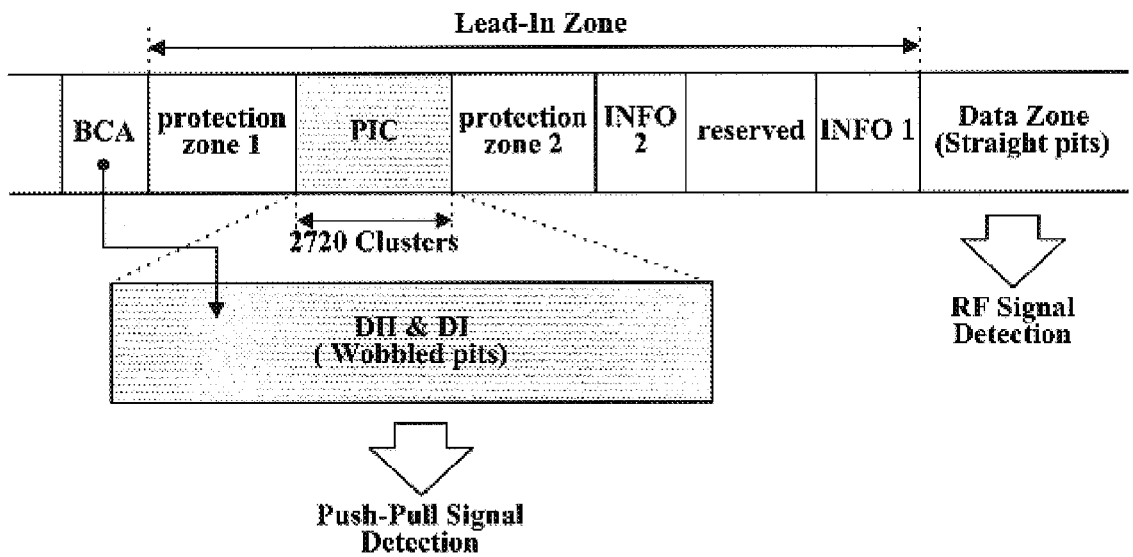

FIGS. 4D, 4E, and 4F illustrate several different exemplary data formats. In FIG. 4D, the DII is encoded in wobbled pits and disc information is recorded as straight pits. In FIG. 4E, the DII and a part of the disc information are encoded in wobbled pits. In FIG. 4F, both of the DII and disc information are encoded in wobbled pits.

The copy protection information, in one example, the ROM mark, may be encoded in intermittently formed wobbled pits to prevent it from being easily detected by common detecting methods, while the data recorded on the data zone is formed of straight pit.

Figure 5:
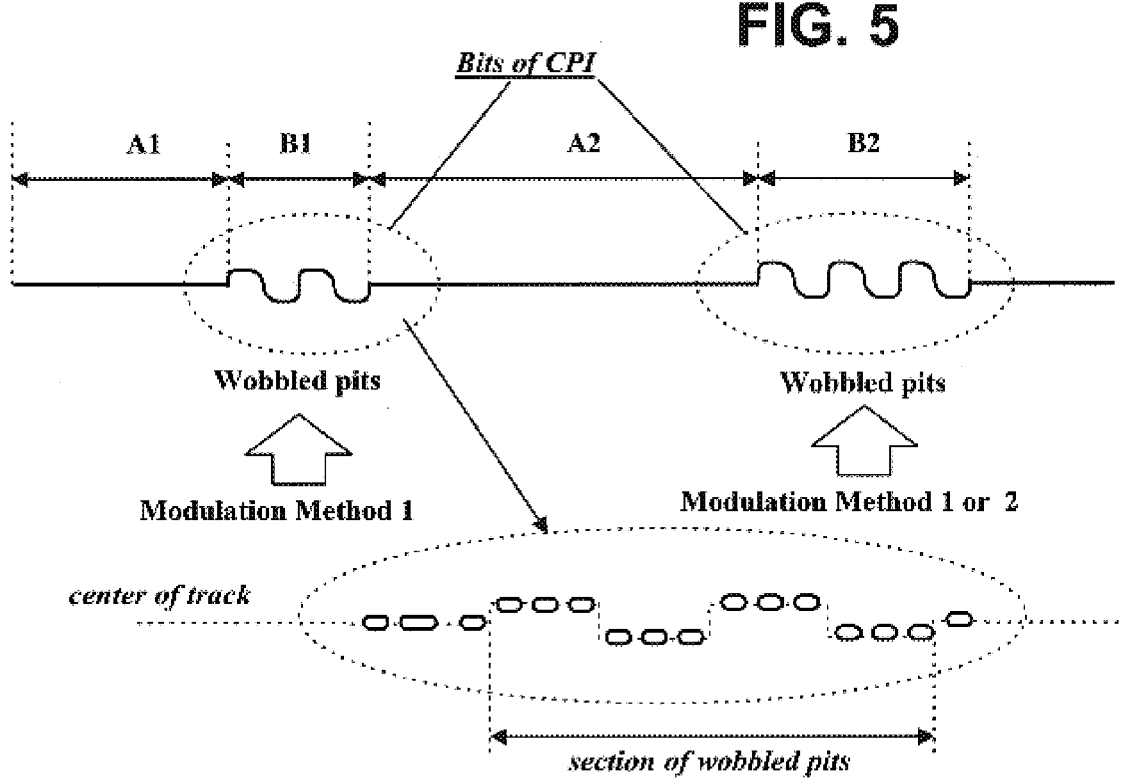
FIG. 5 illustrates an example in which the copy protection information is encoded in intermittently formed arrays of wobbled pits in an exemplary embodiment of the present invention.

FIG. 5 illustrates an exemplary embodiment of the present invention, where the copy protection information is encoded in intermittently formed arrays of wobbled pits.

As shown in FIG. 5, it is preferable that an intermittent wobble structure is recorded on the area instead of a continuous wobble pit structure in order to ensure secrecy or the robustness, such that it prevents a copy protection information from being easily detected by a common detecting method.

In FIG. 5, arrays of straight pits (An) and arrays of wobbled pits (Bn) are formed alternately and the arrays of straight pits are longer length than the arrays of wobbled pits to have different durations. Consequently, the wobbled pits in which the copy protection information is encoded are considered noise signals by common detecting methods.

All of the arrays of straight pits can be made to have the same length and all of the arrays of wobbled pits can be made to have the same length. If the arrays of pits are of different length, that is, if $An \neq Am$ $(n \neq m)$ and $Bn \neq Bm$ $(n \neq m)$, the occurrence of the arrays of wobbled pits is not periodic. This can enhance the security of the copy protection information in that the probability that special information is encoded in wobbled pits becomes lower.

There are various other modulation methods that can be employed to encode the copy protection information in wobbled pits. Analog modulation methods include amplitude modulation (AM), frequency modulation (FM) and digital modulation methods include pulse code modulation (PCM), minimum shift keying (MSK), and binary phase shift keying (BPSK).

Although the same modulation technique can be applied to all arrays of wobbled pits, arrays of wobbled pits can be encoded by different modulation techniques to enhance the security of the copy protection information. In FIG. 5, for example, the first wobbled-pit array, B1, may be encoded by AM and the second wobbled-pit array, B2, may be encoded by FM, etc.

To decrease possible data read errors, in an exemplary embodiment the same data be repeatedly encoded in arrays of wobbled pits.

The region of wobbled pit and the region of no wobble pit may be combined or a plurality of regions may be combined and then a bit for copy protection can be detected. For example, recording region of wobble pit corresponding to the data bit is recorded dispersly to several regions, and the wobble pits is formed such that the amplitude of wobble are small, and then the bit can be detected by detecting a pushpull signal of low level and integrating the signal.

In an exemplary embodiment, the copy protection information has a size of no more than 128 bits, but if header information and redundant data for ECC are appended, the size can increase up to 1 KB.

As shown in FIG. 6, a physical cluster of the BD-ROM may have an exemplary size of 64 KB and includes 16 address units. Each address unit may further include 31 data frames. As a result, if the first data frame (Data Frame #0) of each address unit is encoded in wobbled pits to record a byte of the copy protection information, a physical cluster can store up to 16 bytes.

Hence, the copy protection information of size 1 KB can be contained in 64 clusters. If an exemplary PIC zone may include 2,720 clusters, the PIC zone will have enough space to store the copy protection information at least one. Further, the copy protection information can be recorded in the PIC zone more than once to enhance reliability of the recorded data.

In other exemplary embodiments, it is also possible to form data frames other than the first data frame of each address unit as wobbled pits or more than two data frames of each address unit as wobbled pits to encode the copy protection information.

Instead of encoding the copy protection information in a fixed data frame within each address unit, the information can also be encoded in an arbitrary data frame within each address unit. In this exemplary embodiment, the occurrence of low-frequency signals created by the wobbled pits is not of periodic nature and thus it can enhance the information security as described above.

The copy protection information can also be recorded as straight pits. In this exemplary embodiment, the copy protection information can be encrypted before being recorded and a key value to decrypt the encrypted copy protection information can be encoded in wobbled pits, thereby preventing illegal copying of the contents.

Figure 7:
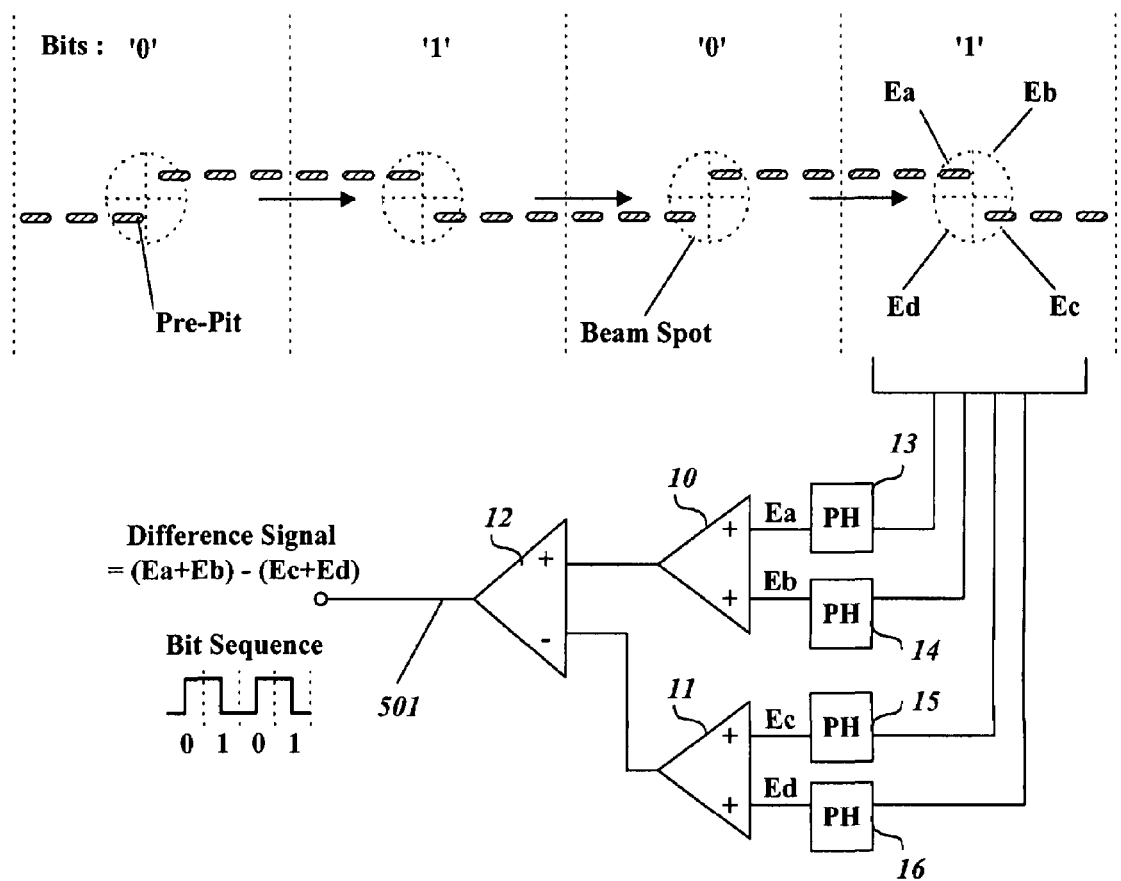
FIG. 7 illustrates information encoded in wobbled pits and a circuit for detecting the information in an exemplary embodiment of the present invention.

FIG. 7 illustrates the disc information encoded in wobbled pits by bi-phase modulation and a circuit for detecting the information, wherein an exemplary value of '0101'is encoded in bi-phase modulated form, e.g., bi-phase modulated HFM Groove, along with wobbled pits. In this example, a data bit is recorded as marks and spaces of length 36T including six 3T marks. Six pits representing '1' and six pits representing '0' are shifted from the track center in the opposite directions.

Figure 1B:
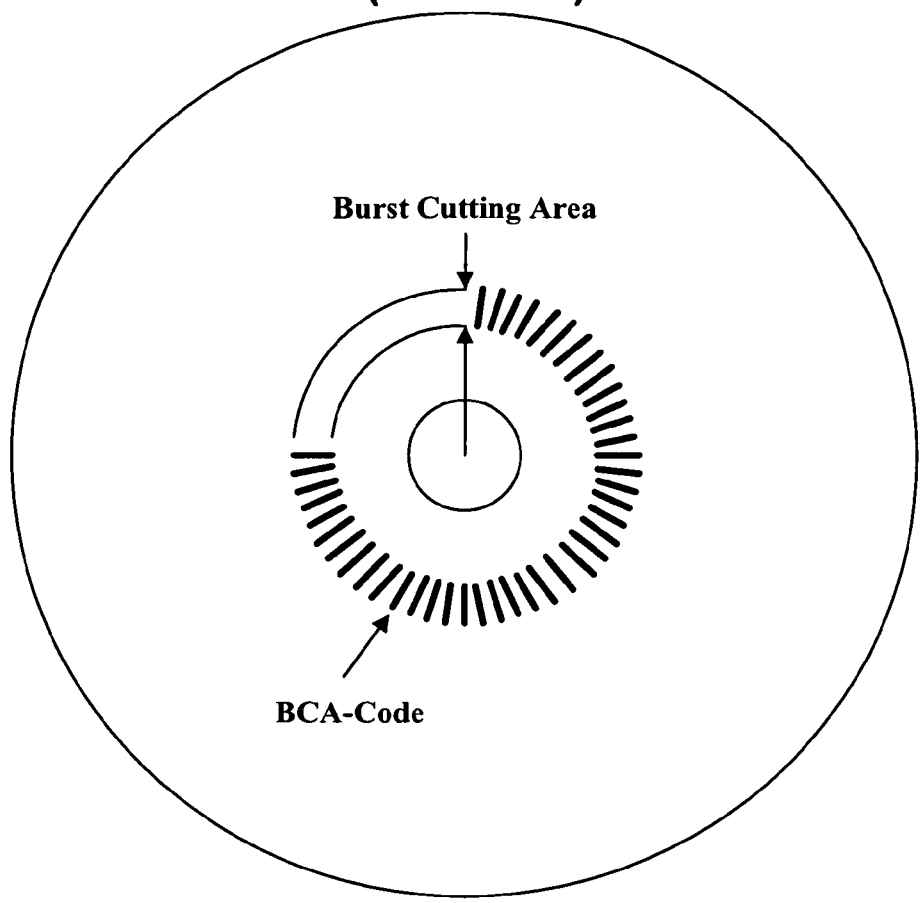
Figure 2:
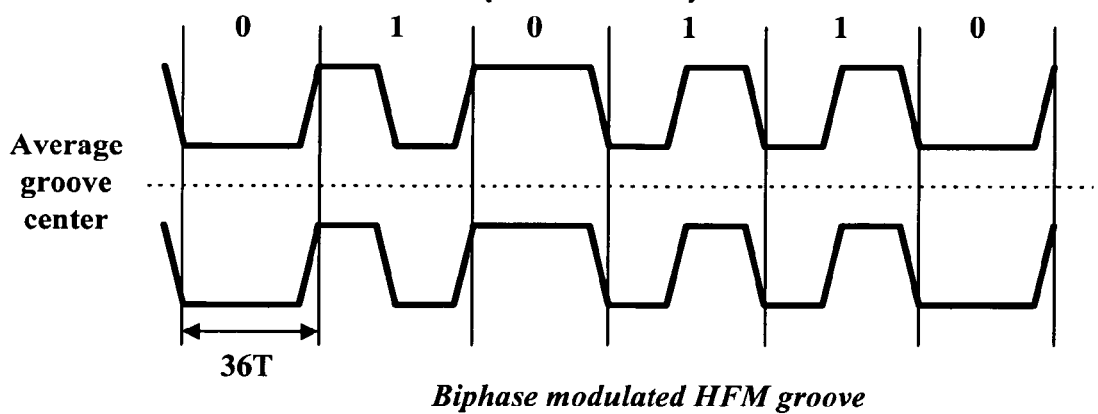
FIG. 2 illustrates a high-frequency modulated (HFM) groove formed in the PIC area of a BD-RE.

As shown in FIG. 7. the structure by bi-phase modulation is different from the structure illustrated in FIG.2. That is, the method of FIG.2 has a bit with value 0, which is represented by a transition at the start of the bit cell and a bit with value 1, which is represented by a transition at the start and in the middle of the bit cell. Otherwise, the method of FIG.7 has a bit with value 0, which is represented by a transition at the start of low and in the middle of high, and a bit with value 1, which is represented by the transition in the opposite direction. The combination of bits consists of data to detect information recorded as wobbled pit. The information can be copy protection information, i.e., key data to decrypt main data recorded on the data zone of the recording medium as shown in FIGS. 4A to 4F.

That is, the wobbled pit data can be reproduced or detected only when the bi-phased modulation data modelated by HFM is detected or reproduced normally. And also, reproduction or decryption of main data is possible only when the wobbled pit data for copy protection is reproduced or detected using the normally detected or reproduced bi-phase modulation data.

In meantime, if the information is encoded in pits, the occurrence of successive pits of the same length may not be allowed and thus pits of different length appear one after another. In this exemplary embodiment, the positions of data pits may also be shifted at intervals of 18 T to encode data in wobbled pits.

The laser beam reflected by the wobbled pits is converted into electric signals by photo detectors 13-16.

The electric signals may be amplified by a push-pull detecting circuit, wherein Ea+Eb and Ec+Ed are amplified separately by amplifiers 10 and 11 and then the difference signal ((Ea+Eb)−(Ec+Ed)) between the two amplified signals is generated by a differential amplifier 12. The data encoded in the wobbled pits is obtained by comparing the difference signal 501 with a threshold level.

Similarly, the DII and/or disc information (or other information) encoded in wobbled pits can be obtained by a push-pull circuit that is used to create the tracking error signal, with no additional error correction and demodulation processes.

If an error due to scratches or other disc deformities occurs when accessing the BCA of a BD-ROM, the DII can be retrieved from the PIC zone and data recorded on the disk can be reproduced using the retrieved information. As a result, the main data recorded in the data zone may be decrypted using a decryption key contained in the DII recorded in the PIC zone.

Since the data encoded in wobbled pits, for example, DII and/or disc information, is not obtained by demodulation, it is not copied when the contents of the BD-ROM is copied to another rewritable medium and therefore the encrypted data copied to the rewritable medium cannot be decrypted, thereby preventing illegal copying of the BD-ROM contents.

Figure 8:
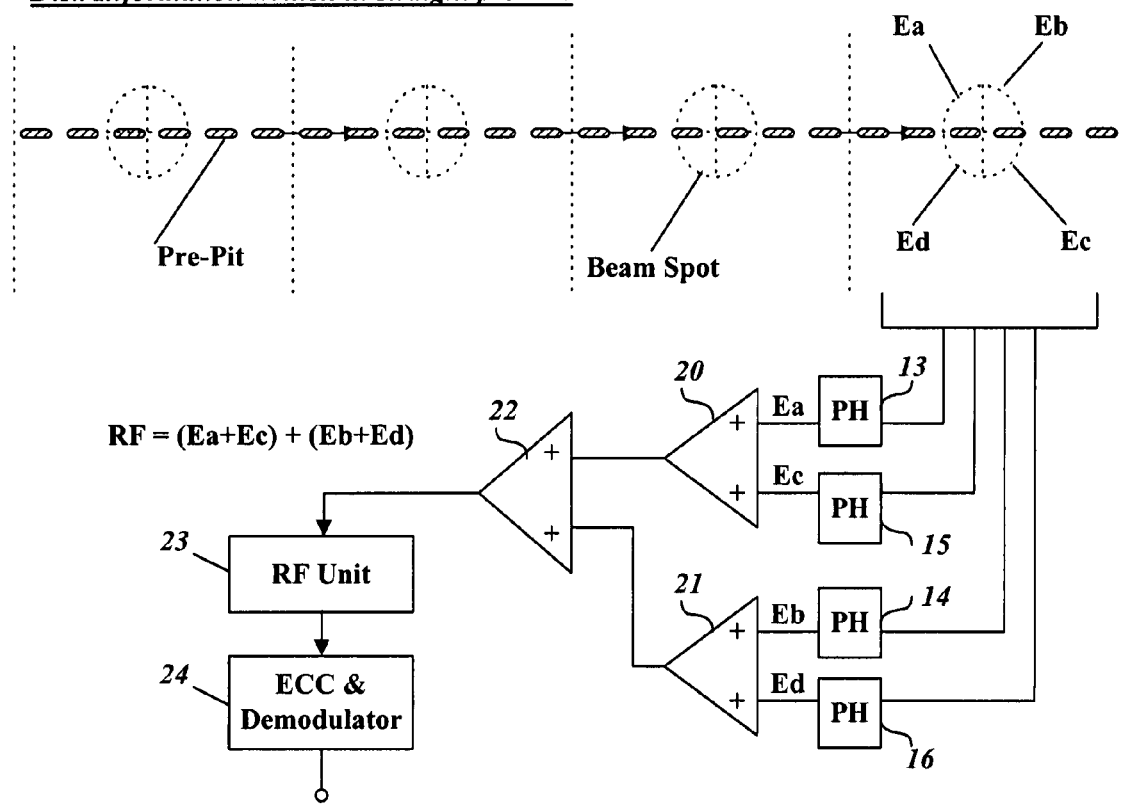
FIG. 8 illustrates information encoded in straight pits and a circuit for detecting the information in an exemplary embodiment of the present invention.

The disc information and copy protection information encoded in straight pits as shown in FIGS. 4C-4E may be detected by the circuit depicted in FIG. 8.

The laser beam reflected by the straight pits is converted into electric signals by photo detectors 13-16 and the electric signals (Ea, Eb, Ec, and Ed) are added together with amplification by one or more summing amplifiers 20, 21, and 22. The RF signal, Ea+Eb+Ec+Ed, which is the output of the summing amplifier 22, is converted into a binary pulse train by an RF unit 23 and converted into digital data by a clock signal synchronized with the binary signal. The original disc information and copy protection information are obtained from the digital data by an ECC & demodulator 24.

The disc information and copy protection information encoded in straight pits can be read in the same way that the main data recorded in the data zone is read.

The disc information may include a disc information ID, a disc information format, a disc type ID, disc size/version, etc, as shown in FIG. 9. An exemplary 3-byte disc type ID indicative of the type of the optical disk can be recorded in the BCA as 2-bit data, as shown in FIG. 10.

For example, if the 2-bit data is 00b, the corresponding optical disk is a BD-RE. If the data is 01b, the corresponding optical disk is a one-time recordable BD-R. If the data is 10b, the corresponding optical disk is a BD-ROM.

The disc information size and a flag indicating whether it is the last disc information can be assigned to a reserved field of the disc information.

Figure 11:
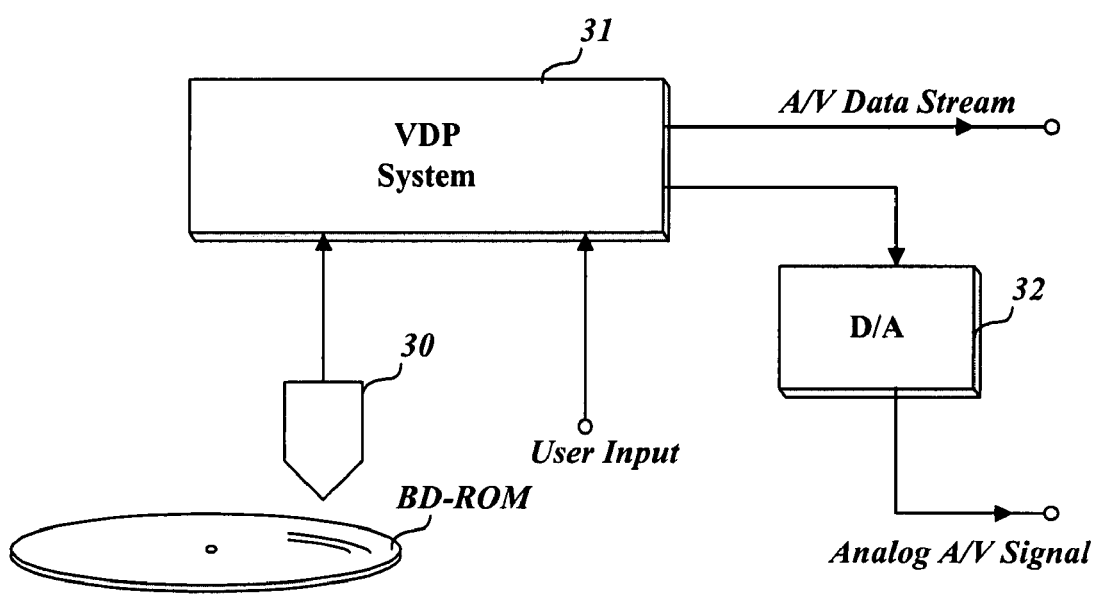
FIG. 11 illustrates a schematic diagram of an optical disk reproducing apparatus capable of reproducing a BD-ROM in accordance with an exemplary embodiment of the present invention.

FIG. 11 illustrates a schematic diagram of a general optical disk reproducing apparatus including an optical pickup 30, a video disc play (VDP) system 31, and a D/A converter 32. Once an optical disk is loaded, the VDP system 31, which performs signal processing and servo control, detects the disk type information recorded in the BCA and performs appropriate servo initialization according to the detected disk type.

The VDP system 31 can detect the disc information encoded in wobbled pits, e.g., a key data to encrypt and/or decrypt the main data of data zone, in the PIC zone from the push-pull signal.

Where the disc information size and a flag indicating whether it is the last disc information are assigned to a reserved field, the disc information and copy protection information recorded in the PIC zone can be detected more accurately using the information in the reserved field.

In another exemplary embodiment, it is possible that a transition zone for separately detecting the disc information and the copy protection information is allocated to the PIC zone.

If the copy protection information is encrypted and encoded in straight pits, the VDP system 31 detects the decryption key encoded in wobbled pits in the PIC zone as described in FIG. 7, decrypts the copy protection information read from the straight pits, and stores the decrypted copy protection information. When the main data recorded in the data zone is reproduced, the main data is decrypted using the stored copy protection information.

The high-density, read-only, and/or optical disk and disc information recording method therefore in accordance with exemplary embodiments of the invention may repeatedly record important information required for the protection of the contents recorded on the disk and encode the information in wobbled pits, thereby enhancing data reliability and preventing illegal copying of the contents of the disk.

Although exemplary embodiments of the present invention have been described in conjunction with a high-density, read-only recording medium, the teachings of the present invention are also applicable to other recording media, such as recordable, rewritable, or rewritable once media and methods and apparatuses associated therewith, as would be known to one of ordinary skill in the art.

Although certain exemplary embodiments of the present invention have been disclosed, it is noted that the present invention may be embodied in other forms without departing from the spirit or essential characteristics thereof. The exemplary embodiments are therefore to be considered in all respects as illustrative and not restrictive, the scope of the invention being indicated by the appended claims, and all changes that come within the meaning and range of equivalency of the claims are therefore intended to be embraced therein.

What is claimed is:

1. A recording medium including recorded data, comprising:
    a control data area including pits formed along tracks, with data recorded therein, wherein pits in some portions of the tracks are formed as wobbled pits, and pits in other portions of the tracks of the control data area are substantially formed as straight pits, wherein the wobbled pits are formed intermittently or alternately with the straight pits within the control data area; and
    a main data area including a main data recorded with modulation in straight pits formed along tracks,
    wherein the control data area includes one or more address units, the address unit comprises a plurality of frames, the wobble pits and the straight pits being formed in unit of frame and the address unit including at least one frame with the wobbled pits and at least one frame without the wobbled pits,
    wherein the data in the control data area includes control information used for controlling reproduction and/or recording of the main data, the control information being encoded along with plural arrays of the wobbled pits, and
    wherein the control information is recorded by bi-phase modulation method in such a manner that bit 0 and bit 1 are determined respectively depending on a direction of a transition within a period, one of the bit 0 and the bit 1 is represented by a transition from low at a start to high in a middle and another one is represented by a transition in a opposite direction within the period.

2. The recording medium according to claim 1, wherein the data in the control data area is recorded in the wobbled pits by bi-phased modulation.

3. The recording medium according to claim 2, wherein control information comprises arrays of the wobbled pits and arrays of the straight pits periodically.

4. The recording medium according to claim 3, wherein arrays of the wobbled pits and arrays of the straight pits in the control data area are of different length.

5. The recording medium according to claim 1, wherein the wobble pits are formed in more than two frames within one address unit.

6. The recording medium according to claim 1, wherein the wobbled pits are formed in a first frame or at least one frame other than the first frame within one address unit.

7. A method of reproducing data from a recording medium, comprising:
    detecting data recorded in pits formed along tracks in a control data area, wherein pits in some portions of the tracks are formed as wobbled pits, and pits in other portions of the tracks of the control data area are substantially formed as straight pits, wherein the wobbled pits are formed intermittently or alternately with the straight pits within the control data area, wherein the control data area includes one or more address units, the address unit comprises a plurality of frames, the wobble pits and straight pits being formed in unit of frame and the address unit including at least one frame with the wobbled pits and at least one frame without the wobbled pits;
    wherein the data in the control data area includes control information used for controlling reproduction and/or recording of the main data, the control information being encoded along with plural arrays of the wobbled pits, and
    wherein the control information is recorded by bi-phase modulation method in such a manner that bit 0 and bit 1 are determined respectively depending on a direction of a transition within a period, one of the bit 0 and the bit 1 is represented by a transition from low at a start to high in a middle and another one is represented by a transition in an opposite direction within the period; and
    generating the control information in the unit of frame to reproduce main data recorded with modulation in straight pits formed along tracks of a main data area of the recording medium.

8. A method according to claim 7, wherein said
    detecting step comprises converting signals reflected from the wobbled pits into electrical signals; and generating the data by applying the electrical signals to a logic circuit.

9. A method according to claim 8, further comprising:
    reproducing the main data using the generated control information.

10. A method according to claim 7, wherein said
    detecting step detects the data recorded in pits from a difference signal between a right and a left electric signals, generated by a beam reflected from the pits formed along the tracks.

11. A method according to claim 10, wherein said
    detecting step further detects the main data from a high-frequency electric signal generated by a beam reflected from the straight pits.

12. The method according to claim 7, wherein the
    detecting step detects the data in the control data area that comprises arrays of the wobbled pits and arrays of the straight pits having different length respectively in the control data area.

13. The method according to claim 7, wherein the wobble pits are formed in more than two frames within one address unit, and
    wherein the generating step generates the control information formed as the wobbled pits in more than two frames within one address unit.

14. The method according to claim 7, wherein the wobbled pits are formed in a first frame or at least one frame other than the first frame within one address unit, and
    wherein the generating step generates the control information formed as the wobbled pits in the first frame or said at least one frame other than the first frame within one address unit.

15. An apparatus for reproducing data from a recording medium, said apparatus comprising:
- a detection unit configured to detect data recorded in pits formed along tracks in a control data area, wherein pits in some portions of the tracks are formed as wobbled pits, and pits in other portions of the tracks of the control data area are formed as straight pits,
- wherein the wobbled pits are recorded intermittent or alternate with the straight pits, wherein the control data area includes one or more address units, the address unit comprises a plurality of frames, the wobble pits and straight pits being formed in unit of frame, the address unit including at least one frame with the wobbled pits and at least one frame without the wobbled pits, wherein the data in the control data area includes control information used for controlling reproduction and/or recording of main data, the control information being encoded along with plural arrays of the wobbled pits, and wherein the control information is recorded by bi-phase modulation method in such a manner that bit 0 and bit 1 are determined respectively depending on a direction of a transition within a period, one of the bit 0 and the bit 1 is represented by a transition from low at a start to high in a middle and another one is represented by a transition in an opposite direction within the period,
- the detection unit being configured to convert signals reflected from the pits into electric signals and generating data from the electrical signals; and
- a data processor configured to process the control information in the unit of frame from the data and to process the main data recorded with modulation in straight pits formed along tracks of a main data area of the recording medium by using the control information.

16. The apparatus according to claim 15, further comprising:
- a controller, coupled to said detection unit and said data processor, to control the detection of the control information and the processing of the main data, the controller being configured to control said data processor to output the main data based on the control information.

17. The apparatus according to claim 16, wherein the controller is configured to control said detection unit to detect the control information by a push-pull method.

18. The apparatus according to claim 15, wherein the detection unit is configured to detect the wobble pits formed in more than two frames within one address unit, and
- wherein the data processor is configured to generate the control information formed as the wobbled pits in more than two frames within one address unit.

19. The apparatus according to claim 15, wherein the detection unit is configured to detect the wobbled pits formed in a first frame or at least one frame other than the first frame within one address unit, and
- wherein the data processor is configured to generate the control information formed as the wobbled pits in the first frame or said at least one frame other than the first frame within one address unit.

* * * * *